(12) United States Patent
Kleppe et al.

(10) Patent No.: US 11,209,636 B2
(45) Date of Patent: Dec. 28, 2021

(54) HIGH-RESOLUTION SCANNING MICROSCOPY

(71) Applicant: Carl Zeiss Microscopy GmbH, Jena (DE)

(72) Inventors: Ingo Kleppe, Jena (DE); Yauheni Novikau, Apolda (DE)

(73) Assignee: Carl Zeiss Microscopy GmbH, Jena (DE)

( * ) Notice: Subject to any disclaimer, the term of this patent is extended or adjusted under 35 U.S.C. 154(b) by 142 days.

(21) Appl. No.: 16/732,585

(22) Filed: Jan. 2, 2020

(65) Prior Publication Data

US 2020/0218047 A1 Jul. 9, 2020

(30) Foreign Application Priority Data

Jan. 7, 2019 (DE) .................... 10 2019 100 184.6

(51) Int. Cl.
*G02B 21/06* (2006.01)
*G02B 21/00* (2006.01)

(52) U.S. Cl.
CPC ....... *G02B 21/0076* (2013.01); *G02B 21/008* (2013.01); *G02B 21/0032* (2013.01); *G02B 21/0036* (2013.01); *G02B 21/0072* (2013.01)

(58) Field of Classification Search
CPC ............ G02B 21/0076; G02B 21/0032; G02B 21/0036; G02B 21/0072; G02B 21/008;
(Continued)

(56) References Cited

U.S. PATENT DOCUMENTS 3,013,467 A 12/1961 Minsky
6,166,853 A 12/2000 Sapia et al.
(Continued)

FOREIGN PATENT DOCUMENTS

DE 102010049627 A1 5/2011
DE 102015107367 A1 11/2016
(Continued)

OTHER PUBLICATIONS

DeLuca, Giulia M.R., et al.; "Re-scan confocal microscopy: scanning twice for better resolution"; Biomedical Optics Express 2013; 4(11):2644-2656.
(Continued)

*Primary Examiner* — Arnel C Lavarias
(74) *Attorney, Agent, or Firm* — Duane Morris LLP (57) ABSTRACT

A method for high-resolution scanning microscopy of a sample in which a sample is illuminated at a point in or on the sample by means of illumination radiation. The point is imaged along an optical axis and according to a point spread function into a diffraction image on a spatially resolving surface detector that comprises detector pixels in which a diffraction structure of the diffraction image is resolved. The point is displaced relative to the sample in at least two scanning directions and pixel signals are read from the detector pixels in various scanning posi- tions, wherein the pixel signals are respectively assigned to that scanning position at which they were read out and adjacent scanning positions overlap one another and are disposed according to a scanning increment. An image of the sample having a resolution that is increased beyond a resolution limit of the imaging is generated from the read pixel signals and the assigned scanning positions, wherein a deconvolution is carried out. Intermediate positions are generated for at least one of the scanning directions in the deconvolution on the basis of the pixel signals and the image of the sample, which contains more image points than scanning positions, is generated.

13 Claims, 2 Drawing Sheets

(58) Field of Classification Search
CPC .. G02B 21/00; G02B 21/0004; G02B 21/002; G02B 21/0024; G02B 21/0048; G02B 21/0052; G02B 21/006; G02B 21/36; G02B 21/361; G02B 21/365
USPC ....... 359/385, 362, 363, 368, 369, 388, 389, 359/390
See application file for complete search history.

(56) References Cited

U.S. PATENT DOCUMENTS

| | | | |
|---|---|---|---|
| 8,705,172 | B2 | 4/2014 | Kleppe et al. |
| 2011/0267688 | A1* | 11/2011 | Kleppe .............. G02B 21/0072 359/385 |
| 2018/0113292 | A1 | 4/2018 | Novikau et al. |
| 2019/0064495 | A1 | 2/2019 | Kleppe et al. |
| 2019/0271648 | A1* | 9/2019 | Bathe .................. G02B 21/0032 |
| 2020/0116987 | A1* | 4/2020 | Kleppe ................ G02B 21/361 |
| 2020/0301121 | A1* | 9/2020 | Kalinin ................ G02B 21/367 |
| 2021/0181489 | A1* | 6/2021 | Uhl ...................... G02B 21/008 |

FOREIGN PATENT DOCUMENTS

| | | |
|---|---|---|
| DE | 102017119531 A1 | 2/2019 |
| EP | 2317362 A1 | 5/2011 |
| JP | 2006221190 A * | 8/2006 |

OTHER PUBLICATIONS

Dirac comb (https://en.wikipedia.org/wiki/Dirac_comb).
Fourier transform (https://en.wikipedia.org/wiki/Fourier_transform).
Gregor, Ingo, et al.; "Non-linear image scanning microscopy (Conference Presentation)"; Proc. SPIE 10071, Single Molecule Spectroscopy and Superresolution Imaging X, 100710C (Apr. 24, 2017); https://doi.org/10.1117/12.2255891.
Jesacher, Alexander, et al.; "Three-dimensional information from two-dimensional scans: a scanning microscope with postacquisition refocusing capability"; Optica 2015; 2(3):210-213.
Mueller, Claus B., et al.; "Image Scanning Microscopy"; Physical Review Letters 2010; 104(19):19801-1-198101-4.
Pavilion, N., et al.; "Compressed sensing laser scanning microscopy"; Optics Express 2016; 24(26):30038-30052.
Roth, Stephan, et al.; "Optical photon reassignment microscopy (OPRA)"; Optical Nanoscopy 2013; 2(5):1-6.
Sarder, Pinaki, et al.; "Deconvolution Methods for 3-D Fluorescence Microscopy Images"; IEEE Signal Processing Magazine May 2006; 32-45.
York, Andrew G., et al.; "Resolution doubling in live, multicellular organisms via multifocal structured illumination microscopy"; Nature Methods Dec. 2011; 1-6.

* cited by examiner

HIGH-RESOLUTION SCANNING MICROSCOPY

RELATED APPLICATIONS

The present application claims priority benefit of German Application No. DE 10 2019 100 184.6 filed on Jan. 7, 2019, the contents of which is incorporated by reference in its entirety.

FIELD OF THE INVENTION

The invention relates to a method for high-resolution scanning microscopy of a sample, wherein the sample is illuminated at a point in or on the sample by means of illumination radiation, the point is imaged along an optical axis and according to a point spread function into a diffraction image on a spatially resolving surface detector that comprises detector pixels. A diffraction structure of the diffraction image is resolved, the point is displaced relative to the sample and pixel signals are read from the detector pixels for scanning positions. Adjacent scanning positions overlap and are disposed according to a scanning increment, and an image of the sample having a resolution that is increased beyond a resolution limit of the imaging is generated from the read pixel signals and the assigned scanning positions.

The invention further relates to a microscope for high-resolution scanning microscopy of a sample. The microscope includes an illumination beam path for illuminating a point on or in the sample, and an imaging beam path for diffraction-limited imaging of the point along an optical axis into a diffraction image on a spatially resolving surface detector that has detector pixels. The imaging beam path has a point spread function and the surface detector resolves the one diffraction structure of the diffraction image. A scanning device is provided for displacing the point relative to the sample. An evaluation device, which is connected in controlling fashion to the surface detector and the scanning device and which is configured to actuate the scanning device for displacing the point relative to the sample, to read out pixel signals from the detector pixels at readout times. The readout times set scanning positions and adjacent scanning positions overlap and are disposed according to a scanning increment, and to generate an image of the sample having a resolution that is increased beyond a resolution limit of the imaging beam path from the read pixel signals and the scanning positions belonging to the respective readout time.

BACKGROUND OF THE INVENTION

A conventional field of application of light microscopy is laser scanning microscopy (in short also LSM), which uses a confocal detection arrangement to image only that plane of the sample that is situated in the focal plane of the objective (cf. U.S. Pat. No. 3,013,467 A). Obtained is an optical section, the thickness of which depends on the size of the confocal stop. The recording of multiple optical sections at different depths of the sample permits the generation of a three-dimensional image of the sample, which is then made up of the different optical sections. Laser scanning microscopy is therefore suitable for examining thick preparations.

In laser scanning microscopy, the sample is scanned in different scanning positions. At each scanning position, a confocal signal is recorded by means of a pinhole. The spatial resolution is decisively determined by the density of the scanning positions. The number of image points obtained precisely equals the number of scanning positions. Therefore, an increase in the density of the scanning positions is directly linked to a reduction in the pinhole stop as the pinhole must be reduced in size when the scanning positions are moved closer together. This limits the increase in resolution since the signal-to-noise ratio at the detector becomes so inexpedient in the case of a pinhole that is too small that the individual signals obtained at the scanning positions can no longer be composed to make a meaningful image. So-called Airy scan microscopy uses this as a starting point. It increases the resolution by virtue of allowing a denser arrangement of the scanning positions without having to accordingly reduce the pinhole in size. Instead, the sample light is detected with spatial resolution, i.e., imaged on a spatially resolving detector, said sample light coming from a sample region that, in conventional laser scanning microscopy, would correspond to a pinhole that is too large and would therefore not be suitable for increasing the resolution. At the same time, the distance between the scanning positions is reduced in such a way that the individual scanning positions now overlap. Nevertheless, image information is obtained for each scanning position by way of a mathematical deconvolution, and so, overall, an image arises, the number of pixels, of which corresponds to the number of scanning positions (which are now closer together). Since the density of the scanning positions is increased in relation to conventional laser scanning microscopy, the resolution is ultimately also improved.

Overcoming the resolution limit of the conventional laser scanning microscope in this way is described in EP 2317362 A 1, for example. This document combines, in the embodiment illustrated and described in FIG. 5 therein, a diffraction-limited illumination of the sample with a surface detector, wherein a scanning device is embodied such that the diffraction image of the point that is illuminated with the diffraction-limited illumination spot rests on the surface detector. This arrangement is referred to as a so-called "de-scanned" detector arrangement. It is typically achieved by disposing a scanner that deflects the beam path between the sample and the combination point between illumination device and imaging device. Such a scanner acts both on the illumination spot and on the imaging of the point that is illuminated with the illumination spot, with the result that the beam path in the imaging direction after the scanner is static. An alternative to such a scanner is the use of a movable sample stage which displaces the sample. In that case, the diffraction image also rests on the surface detector. In the concept of EP 2317362 A1, the surface detector is provided with a spatial resolution that, in relation to the imaging scale, effects oversampling of the diffraction image and allows the structure of the diffraction image to be resolved and consequently facilitates the denser arrangement of the scanning positions (in relation to conventional laser scanning microscopy). Further publications relating to Airy scan microscopy include U.S. Pat. No. 8,705,172, DE 102010049627 A1, US 2011/0267688 and the publications C. Mueller et al., Phys. Rev. Lett., 104, 198101, 2010; A. York et al., "Resolution doubling in live, multi-cellular organisms via multifocal Structured Illumination Microscopy", Nature Methods, Vol. 9, 2012; G. De Luca et al. "Re-scan confocal microscopy: scanning twice for better resolution", Biomedical Optics Express, 4 (11), pp. 2644-2656; S. Roth, "Optical photon reassignment microscopy (OPRA)" arXiv: 1306.6230, I. Gregor et al., Proc. SPIE 10071, "Single Molecule Spectroscopy and Superresolution Imaging X", 100710C, Apr. 24, 2017, doi: 10.1117/

12.2255891; and A. Jesacher et al., "Three-dimensional information from two-dimensional scans: a scanning microscope with postacquisition refocusing capability", Optica 2, pp. 210-213, 2015. The latter publication uses a phase mask for z-coding of the depth information.

Since the image arises sequentially by scanning in both laser scanning microscopy and in Airy scan microscopy, the image pixels, i.e., the pixels of the final image, are generated from a temporal sequence of the read signal of the detector. The closer the scanning positions are located together, i.e., the time elapses between temporal readouts, the smaller scanning pixels can be assigned, in principle. This is linked to the spatial resolution by way of the so-called Nyquist theorem. Accordingly, oversampling by at least a factor of 2 is required in order to obtain a desired resolution. However, the data rate increases and/or the effective recording speed with which the microscope can be operated decreases in the case of a fast readout of a detector, As a rule, the noise performance of the detector deteriorates when it is operated at a high data rate, i.e., if the readout should be carried out at high frequency.

SUMMARY OF THE INVENTION

The invention is based on the object of increasing the recording speed (e.g., reducing the readout speed) in Airy scan microscopy, without losing resolution.

The invention is defined in the independent claims. The dependent claims relate to advantageous embodiments and developments.

The invention makes provision for a method for high-resolution laser scan microscopy of a sample in accordance with the Airy scan principle, The sample is illuminated with illumination radiation. An illuminated point on the sample is imaged in a diffraction-limited fashion into a diffraction image on a surface detector. This is implemented along an optical axis and in accordance with a point spread function (also abbreviated PST below), which, as is known, describes the imaging resolution. The surface detector comprises pixels and has a spatial resolution that resolves a diffraction structure of the diffraction image. The imaged point is displaced in relative fashion in at least two scanning directions relative to the sample. In principle, scanning positions that specify individual positions of the respectively imaged sample spot on the sample are set. The scanning positions are chosen in such a way that each point of the sample is contained multiple times in a diffraction image. This is preferably satisfied in the case of a raster-type scan for each scanning direction, i.e., the overlap is then provided in the x-, y- and z-direction. Adjacent scanning positions are disposed in accordance with a scanning increment in at least one certain direction. Then, their centers are spaced apart by one scanning increment. Naturally, it would also be possible to relate to a different reference point other than the centers. The pixel signals are assigned to the scanning positions at which they were obtained.

The scanning directions may comprise the x-direction and/or the y-direction and/or the z-direction.

Depending on the configuration of the scanner, the scanning positions are thus linked to readout times. If the scanner is continuously displaced in one direction, the readout times define the scanning positions, i.e., the respective position of the scanner, at which the detector is read. Then, pixel signals from the detector pixels are read at readout times. As a rule, this is implemented with a uniform readout clock. In the case of scanners operating on a step-by-step basis, it is purely the actuation of the scanner that sets the scanning position.

There are also mixed forms, in which, for example, a scanner is displaced in continuous fashion in one direction (e.g., the x-direction) and displaced in step-wise fashion perpendicular thereto (e.g., in the y-direction). Here, the term "scanner" also subsumes a depth scan, i.e., the scanner can also bring about a displacement in the z-direction; this may also be implemented in continuous or stepwise fashion.

As a rule, a three-dimensional and/or, e.g., linear deconvolution is carried out on the basis of the read pixel signals and the associated scanning positions and on the basis of the point spread function, and the image of the sample is generated. Here, within the deconvolution, intermediate positions are generated for at least one scanning direction on the basis of the pixel signals. Then, the image of the sample that contains more image points than scanning positions is generated by means of these intermediate positions. Consequently, the resolution is increased beyond that of conventional Airy scan microscopy.

It is important that the adjacent scanning positions overlap. With respect to the point spread function, the full width at half maximum can be used for orientation purposes. In order to realize the overlap, the scanning increment is less than twice the full width at half maximum of the point spread function. If the optical resolution limit is used for orientation purposes, the scanning increment is less than the optical resolution limit.

Since a deconvolution in the microscopy carried out according to the Airy scan principle contains a Fourier transform, as a rule, embodiments which generate intermediate positions in the Fourier space after the pixel signals were Fourier transformed for each scanning position during the deconvolution are preferred. Then, the intermediate positions are represented by frequencies, specifically higher frequencies, in Fourier space and represented by positions between the scanning positions in real space.

In order to read the surface detector as slowly as possible, the scanning increment is kept within one length interval in the scanning direction, preferably in all scanning directions, i.e., in the x-direction and/or y-direction and/or z-direction, in embodiments. Above, the length interval is limited by twice the full width at half maximum of the point spread function. This ensures that the imaged sample spots of adjacent scanning positions overlap. Below, the length interval is limited by the full width at half maximum of the point spread function; this lies above the minimum requirement of the Nyquist theorem. The full width at half maximum of the point spread function is measured along the respective (x, y, z)-direction in each case. Consequently, in embodiments, the length interval has different limits for different directions. x and y are examples of directions transverse to the optical axis; the z-direction extends along the optical axis. In the case of a conventional, rotationally symmetric PSF, the length interval is usually identical for the x- and y-direction while, as a rule, it is greater for the z-direction.

Preferably, the scanning positions have a greater spacing than what is prescribed by Nyquist and the prior art. This reduces the image recording duration in relation to conventional Airy scan microscopy and nevertheless increases the resolution since the information from various detector pixels is used for generating the intermediate positions. As a result, oversampling according to Nyquist is no longer required. Knowledge about the point spread function during the imaging (and optionally during the illumination, i.e., excitation, as well) allows the scanning increment to be balanced against the pixel dimensions of the surface detector, i.e., the resolution thereof, in such a way that the number of scanning positions can be minimized. In the case of a z-stack, this may approximately halve the number of required scanning planes, for example.

The detector pixels are the pixels of the surface detector. The image pixels are the pixels of the final, high-resolution image. Scanning pixels arise in each case by reading the detector at a scanning position. The invention increases the number of image pixels in relation to the number of scanning pixels; this was not possible according to Nyquist and conventional Airy scan microscopy. As a result of generating the intermediate positions in the three-dimensional deconvolution, the scanning pixels can be greater than the full width at half maximum of the point spread function. Surprisingly, increasing the scanning increment or reducing the number of scanning pixels does not lead to a loss of resolution. Consequently, this results in the time duration required to generate an image being reduced without having to increase the readout speed of the surface detector; or the resolution is increased in the case of an unchanging image recording duration.

Sometimes, an ambiguity problem may occur when generating images that are stacked in the z-direction. It consists of the fact that although the relative position of a point with respect to the focal plane is known, it is not known whether the point is located above or below the focal plane. Thus, an absolute position is not known. If the point spread function is not modified, it is substantially symmetric with respect to the optical axis (unavoidable residual asymmetries may nevertheless arise due to imperfect components—what is decisive is that there is no targeted PSF manipulation). This symmetry is generally a symmetry with respect to the focal plane. In general, the point spread function is also symmetric with respect to the optical axis, in particular it is rotationally symmetric. In most microscopes, the point spread function corresponds to an hourglass shape, with the waist being situated in the focal plane. Any remaining asymmetries occurring due to the real implementation of the imaging elements do not lead to a modification such that the three-dimensional reconstruction from a single image would produce a depth-resolved image without uniqueness.

This ambiguity can be lifted in a development by virtue of an image stack being implemented from at least two scanning planes that are spaced apart in the z-direction, the depth-of-field ranges of which overlap axially, i.e., in the z-direction, in an overlap region. Then, the scanning increment lies in the z-direction of the length interval. The depth-of-field range (given by twice the full width at half maximum of the point spread function in the axial direction) of the two scanning planes is therefore such that the scanning planes partly (but not completely) cover one another in the axial direction. The ambiguity can be avoided by means of image information from the overlap region. The absolute position can be ascertained from the image information of the overlap region and the ambiguity in the reconstruction can be lifted.

In embodiments, the beam path of the imaging and illumination is thus free of elements that manipulate the point spread function and introduce a targeted, determinable degree of asymmetry, which is necessary and used for the depth-resolved approaches as are explained for example in the publication by Jesacher et al. In particular, the beam path contains no astigmatic lenses or phase masks which modulate the point spread function asymmetrically and in dependence on depth in a targeted fashion in a specific manner.

The three-dimensional reconstruction in an embodiment generates images in multiple discrete sectional planes that are axially spaced apart. In one development, it is preferable to generate the depth-resolved image in such a way that it contains a plurality of discrete sectional planes, the spacing apart of which is smaller than the scanning increment in the axial direction.

Using the illumination radiation, the emission of fluorescence radiation can be excited, which improves the signal-to-noise ratio and overall reinforces the algorithm, in particular the section thickness can then be very thin. Therefore, optionally, the illumination radiation is focused at a point in or on the sample to form a diffraction-limited illumination spot. In the case of the diffraction-limited illumination, the spot imaged in diffraction-limited fashion completely overlaps with the illumination spot.

The microscope, provided analogously to the method, has an evaluation device which performs the method steps and is embodied to be suitable therefor. Analogously to the method, a corresponding microscope is provided, which comprises an illumination beam path for illuminating the sample with said properties and an imaging beam path for the diffraction-limited imaging of the point into a diffraction image on the surface detector with the pixels thereof. Where the text above and/or below explains aspects of the method for microscopy, said aspects equally relate to the evaluation device which is embodied to be suitable for carrying out the corresponding method steps. This may be a computer which is implemented with corresponding software or with corresponding program code. Conversely, aspects described on the basis of the microscope and/or its evaluation device and/or its operation equally relate to the method for microscopy.

It goes without saying that the features mentioned above and those yet to be explained below can be used not only in the combinations specified but also in other combinations or on their own, without departing from the scope of the present invention.

BRIEF DESCRIPTION OF THE DRAWINGS

The invention will be explained in even more detail below on the basis of exemplary embodiments, with reference being made to the attached drawings, which likewise disclose features essential to the invention. These exemplary embodiments serve merely for elucidation and should not be interpreted as restrictive. By way of example, a description of an exemplary embodiment with a multiplicity of elements or components should not be interpreted to the effect that all these elements or components are necessary for implementation purposes. Rather, other exemplary embodiments also may contain alternative elements and components, fewer elements or components or additional elements or components. Elements or components of different exemplary embodiments can be combined with one another, unless indicated otherwise. Modifications and variations which are described for one of the exemplary embodiments may also be applicable to other exemplary embodiments. In order to avoid repetition, the same elements or corresponding elements in different figures are denoted by the same reference signs and are not explained a number of times. In the figures.

DETAILED DESCRIPTION OF EMBODIMENTS OF THE INVENTION

Figure 1:
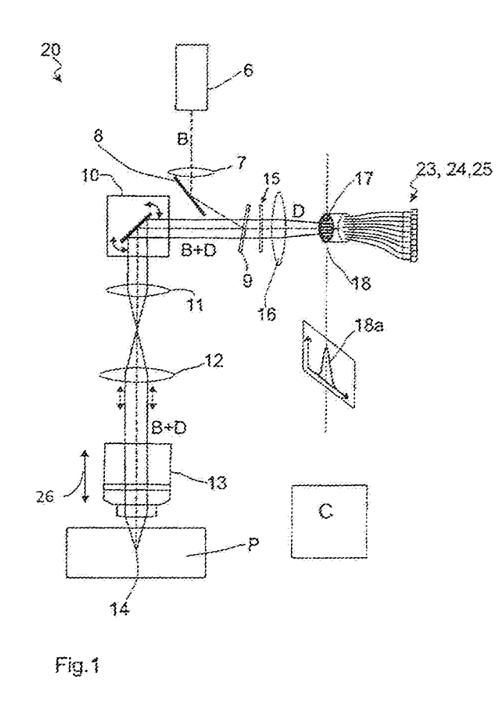
FIG. 1 is a schematic illustration o a microscope for high-resolution microscopy.

FIG. 1 schematically illustrates a confocal microscope 20 with a high resolution, e.g., a resolution which is increased beyond the diffraction limit in accordance with the principle of so-called Airy scans, as is known, e.g., from EP 2317362 A1. It has a light source 6 for illuminating the sample P with an illumination spot 14. The illumination light B is guided via a beam shaping means 7, a mirror 8 to a beam splitter 9. The beam splitter 9 is embodied such that it reflects as much as possible of the illumination light B and guides it to a scanner 10. The illumination light B is guided, from the scanner 10, via further beam shaping optical units 11 and 12 to an objective 13. The objective 13 focuses the illumination light B onto the sample P to form an illumination spot, which is located in a focal plane.

The sample light D generated by the sample in the illumination spot, i.e., at the point 14 is collected by the objective 13 and guided, on the reverse path with respect to the illumination light B, to the beam splitter 9. The beam splitter 9 is embodied such that it transmits as great a portion as possible of the sample light D. The sample light D thus transmitted by the beam splitter 9 is passed to the detector 17 via a further filter 15 and a further beam shaping optical unit 16. The detector 17 detects the sample light D, generates electrical signals therefrom and passes them on, via conductors 23, 24, 25, to a control and evaluation device C, e.g., a computer. In this way, a diffraction image 18 of the point 14 is recorded, which is diffraction-limited, as the diffraction structure 18a demonstrates. Mathematically, this is described by the point spread function (PSF).

In order to obtain an image of the sample P, the point 14 is moved with the scanner 10 over the sample P and the detector 17 is read out in the process. From the signals obtained, an image which can be presented, e.g., using a monitor is compiled by the control and evaluation device C.

The scanner 10 permits a two-dimensional displacement laterally, i.e., in a plane perpendicular to the optical axis of the objective. Moreover, the objective 13 is adjustable by way of a drive 26 in such a way that the position of the focal plane in the sample P is displaced.

Figure 2:
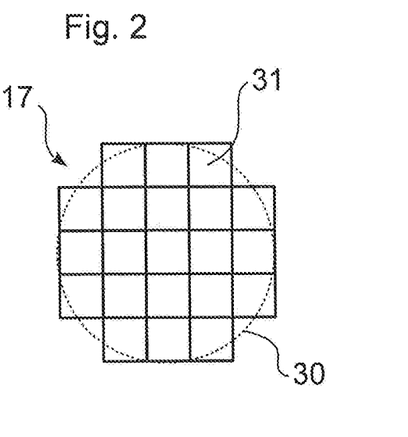
FIG. 2 is a schematic illustration of detector pixels.

FIG. 2 schematically illustrates the detector 17 in a plan view. To achieve the high resolution, the detector 17 of the confocal microscope 20 comprises a plurality of detection elements or pixels 31. In exemplary fashion, the arrangement comprises twenty-one pixels 31; a different number of pixels may also be used. The size of the pixels 31 is chosen such that they are significantly smaller than the diffraction image 18 that is generated on the detector 17. Consequently, the diffraction structure 18a is resolved overall. At the same time, the number of the pixels 31, and consequently the entire surface of the detector 17, is chosen such that a significant portion of the sample light D can be detected for the diffraction image 18. For comparison, FIG. 2 indicates a detector area 30 in dashed fashion, as would be used for a confocal microscope with typical resolution. The term typical resolution is to be understood here to mean that the resolution achieved at most corresponds to the Abbe limit. By contrast, the confocal microscope 20 having increased resolution operates according to the Airy principle, and so theoretically twice as high a resolution can be achieved. In practice, the resolution increase is slightly lower, because structures near the resolution limit can be transmitted only with very poor contrast. Resolutions of realistically up to 1.7 times the Abbe limit can be achieved.

The detector 17 of the confocal microscope 20 with high resolution captures P pixel signals for each scanned point, corresponding to the number of the detector pixels 31. The sample P is scanned by virtue of the point 17 being displaced over the sample P. This is elucidated in FIG. 3. The detector pixels 31 are read at successive readout times. Since the scanner 10 simultaneously displaces the point 14 over the sample, a scanning position 32 is present at each readout time (drawn as circles for simplicity in FIG. 3). In the case of a continuously advancing scanner in the x-direction, the time interval between the readout times sets a local scanning increment d together with the scanning speed, adjacent scanning positions 31 being disposed according to said scanning increment (e.g., spacing of the centers or other fixed reference points). This applies along a scanning axis, specifically the fastest scanning axis, of a raster-type scan. This is the x-direction in FIG. 3. In the case of a completely intermittently operating scanner, the readout clock is unimportant for the definition of the scanning position. For the up to two other scanning axes (y, z) of the raster-type scan, the scanner actuation alone sets the scanning increment d.

Figure 3:
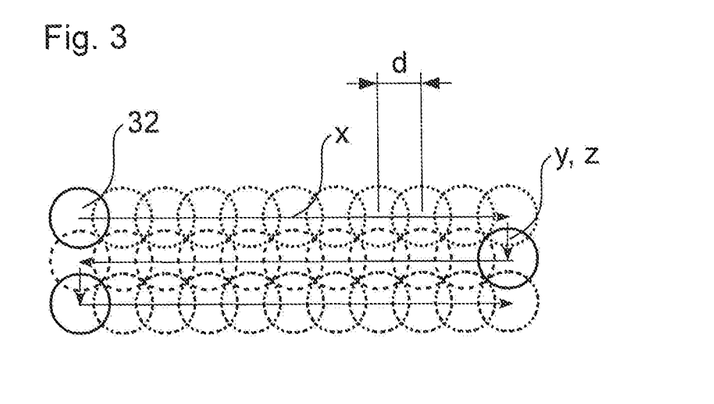
FIG. 3 is a schematic illustration of a scanning pattern.

In at least one certain direction (e.g., the z-direction), the scanning increment d is at least as large as the full width at half maximum of the PSF. Thus, this lower limit is directionally dependent. This is tantamount to half the resolution, i.e., half of the still resolvable structure, in the respective direction. On the other hand, the scanning increment d is not smaller than greater than twice the full width at half maximum of the PSF in the respective direction such that the scanning positions overlap. Consequently, the upper limit is also directionally dependent.

Although each sample point is located at least once in each scanning pixel which is defined by the projection of the detector surface into the sample at the scanning position assigned to the scanning pixel—it is not located there at least twice, as required by the Nyquist theorem.

As a pixel signal, each detector pixel 31 captures a raw image signal from the sample. The raw image signals differ from one another, wherein the differences are determined by the lateral distance of the point 14 relative to the sample region detected by the respective detector pixel. The raw image signals are described mathematically by a convolution of the "real" sample image with the PSF of the respective detector pixel 31.

It is the function of the evaluation unit C to reconstruct from all pixel signals an image that as accurately as possible corresponds to the original of the sample. A deconvolution (DCV) and a subsequent joining of the thus deconvolved raw image signals are used to this end, wherein the processes deconvolution and joining can merge into one another in process-technological fashion.

Figure 4:
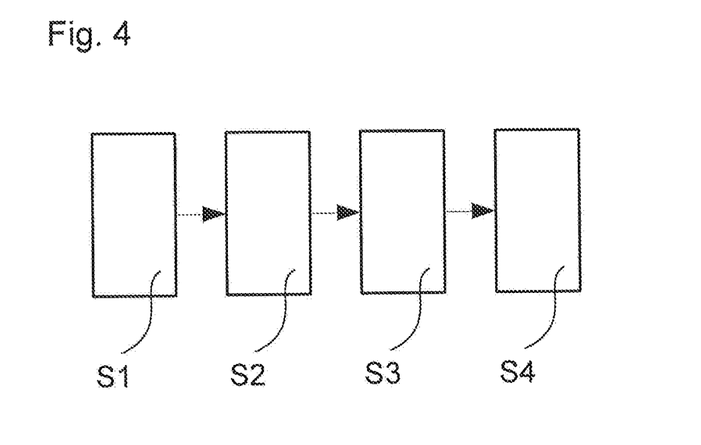
FIG. 4 is a flowchart for the microscopy method.

The procedure for generating an image is illustrated schematically in figure 4, which represents four basic steps S1-S4. In step S1, a scanning process of the sample is started, within the scope of which the point 14 is displaced over the sample surface along the x-direction. After one line was traversed in the x-direction, there is a displacement in the y-direction, as a line jump. Once a plurality of lines were worked through in this way, a second scanning plane is set, i.e., there is an adjustment in the z-direction. For reasons of simplicity, this is combined with the adjustment in the y-direction in FIG. 3. The displacement in the y-direction occurs in FIG. 3 if the representation is considered to be a plan view of the sample P. By contrast, the displacement in the z-direction appears if the representation in FIG. 3 is considered to be a sectional illustration perpendicular to the sample surface, i.e., along the optical axis of the radiation incidence.

In step S2, the signal of the detector 17 is read for all detector pixels 31 continuously during the adjustment, introduced in step S1, at certain scanning positions that are stacked along a scanning increment, e.g., given by a continuous scanner displacement and equidistant readout times.

By way of example, together with the scanning displacement process, each readout time sets one of the scanning positions 32. Then, the readout times are chosen in such a way that the scanning increment d set in FIG. 3 is reached in the x-direction together with the displacement speed.

The scanning positions 32 overlap; however, the overlap is less than half the dimension of the scanning spot or the full width at half maximum of the point spread function.

In step S3, the pixel signals of the detector pixels 31 are assigned to the scanning positions 32 and the scanning procedure is completed.

Subsequently, an image of the sample P is generated in step S4 from the pixel signals with the associated scanning positions by means of a computational reconstruction, the PSF being taken into account.

As already mentioned, the illumination beam path and the imaging beam path in one embodiment obtain no manipulation element to make the point spread function asymmetric in a targeted fashion; in particular, no astigmatic lenses or phase masks are provided. The term manipulation is here directed at a targeted influencing of the point spread function with which an asymmetry is generated that prevents, in particular in the 3D reconstruction, ambiguity between layers that are situated below the focal plane and layers that are situated above the focal plane. Consequently, targeted manipulation means that layers below the focal plane have a uniquely different point spread function than layers which are situated above the focal plane. Such manipulation typically requires the use of phase masks and/or astigmatic elements in the beam path.

The maximum resolution is achieved in the illumination that is additionally diffraction-limited. This case is therefore portrayed in exemplary fashion for the purposes of explaining the reconstruction. Moreover, the resolution is increased in the z-direction in exemplary fashion.

The signal D(r,p) detected overall by all pixels 31 can be considered to be a product of the excitation PSF E(r) and the intensity distribution O(r) of the sample light, convolved with the imaging PSF H(r):

$$D(r, p) = \int_r O(p - r')E(r')H(r' + r)dr' \qquad (1)$$

In equation (1), $p=(p_x,p_y,p_z)$ denotes the location of excitation, i.e., on the sample, and $r=(x,y,z)$ denotes the location of the detector pixel 31. On account of the surface detector, $z=0$ can be set in D since the surface detector only extends in x and y but not in z.

Hence, equation (1) can be written as:

$$D(x, y, p_x, p_y, p_z) = \int_x \int_y \int_z O(p_x - x', p_y - y', p_z - z') \qquad (2)$$
$$E(x', y'z')H(x + x', y + y', z')dx'dy'dz'$$

In the case of a conventional Airy scan evaluation, the summation was carried out in x and y over the coordinates of the surface detector, i.e., over the individual pixels of the surface detector. This is not implemented in this case. Instead, intermediate positions are generated on the basis of the pixel signals. Since the deconvolution operates in the Fourier space according to equation (2), these intermediate positions correspond to additional, higher frequencies in this case. Nevertheless, they are considered as intermediate positions in this case since they represent intermediate positions to the scanning positions when viewed in real space, even if they appear as frequencies in Fourier space. By way of example, intermediate positions are generated by means of a Dirac comb δ (cf. https://en.wikipedia.org/wiki/Dirac_comb) in x, y and z:

$$D_S(x, y, p_x, p_y, p_z) = \sum_{k=-\infty}^{+\infty} D(x, y, p_x, p_y, p_z)\delta(p_z - k\Delta p_z) \qquad (3)$$

Here, $\Delta p_z$ represents the distance between the additional intermediate positions in z. A Fourier transformation of the equation (3) in respect of $p_x, p_y, p_z$ supplies $$D_S^f(x, y, \omega_{p_x}, \omega_{p_y}, \omega_{p_z}) = \sum_{k=-\infty}^{+\infty} D^f\left(x, y, \omega_{p_x}, \omega_{p_y}, \omega_{p_z} - \frac{k}{\Delta p_z}\right) \qquad (4)$$

The Fourier transform of the Dirac comb with the period $\Delta p_z$, is a Dirac comb with the period $1/\Delta p_z$. If the Fourier-transformed equation (1) is inserted in equation (4), a general system of equations of the decomposition is obtained:

$$D_S^f(x, y, \omega_{p_x}, \omega_{p_y}, \omega_{p_z}) = \sum_{k=-\infty}^{+\infty} O^f\left(\omega_{p_x}, \omega_{p_y}, \omega_{p_z} - \frac{k}{\Delta p_z}\right)FT_{x',y',z'} \qquad (5)$$
$$\{E(x', y', z')H(x + x' + x', y + y', z')\}\left(\omega_{p_x}, \omega_{p_y}, \omega_{p_z} - \frac{k}{\Delta p_z}\right)$$

If $FT_{x',y',z'}\{E(x',y',z')H(x+x',y+y',z')\}$ is substituted by $EH(x,y,\omega_{p_x},\omega_{p_y},\omega_{p_z})$, the following is obtained:

$$D_S^f(x, y, \omega_{p_x}, \omega_{p_y}, \omega_{p_z}) = \qquad (6)$$
$$\sum_{k=-\infty}^{+\infty} O^f\left(\omega_{p_x}, \omega_{p_y}, \omega_{p_z} - \frac{k}{\Delta p_z}\right)EH\left(x, y, \omega_{p_x}, \omega_{p_y}, \omega_{p_z} - \frac{k}{\Delta p_z}\right)$$

For reasons of simplicity, let x and y be the detector pixel position and let i be the pixel index:

$$D_{S_i}^f(\omega_{p_x}, \omega_{p_y}, \omega_{p_z}) = \qquad (7)$$
$$\sum_{k=-\infty}^{+\infty} O^f\left(\omega_{p_x}, \omega_{p_y}, \omega_{p_z} - \frac{k}{\Delta p_z}\right)EH_i\left(\omega_{p_x}, \omega_{p_y}, \omega_{p_z} - \frac{k}{\Delta p_z}\right)$$

Due to taking account of the x, y-coordinates of the detector pixels, equation (7) increases the sampling in the object space in the z-direction in relation to the sampling by the measured scanning positions. The transformation is completely defined by the "confocal" Fourier transform of the PSF $$EH_i\left(\omega_{p_x}, \omega_{pp_y}, \omega_{pp_z} - \frac{k}{\Delta p_2}\right).$$

The z-dimension in the object space can be obtained, e.g., by a linear regression analysis in Fourier space. In the deconvolution, the aforementioned additional positions are generated due to the x, y-coordinates of the detector pixels being taken into account such that the image of the sample overall contains more pixels in the specifed direction (z-direction in this case) than there were scanning positions in this specified scanning direction.

This procedure is not restricted to improving in z-direction but can be applied very generally to all three directions x, y and z. Here, use can then be made of a three-dimensional Dirac combs, which is as follows:

$$D_S(x, y, p_x, p_y, p_z) = \sum_{k=-\infty}^{\infty}\sum_{j=-\infty}^{\infty}\sum_{i=-\infty}^{\infty} D(x, y, p_x, p_y, p_z)\delta(p_x - i\Delta p_x)\delta(p_y - j\Delta p_y)\delta(p_z - k\Delta p_z) \quad (8)$$

Analogously to the calculation of equation (3), the Fourier transform of this equation then is:

$$D_S^f(x, y, \omega_{p_x}, \omega_{p_y}, \omega_{p_z}) = \sum_{k=-\infty}^{\infty}\sum_{j=-\infty}^{\infty}\sum_{i=-\infty}^{\infty} D^f\left(x, y, \omega_{p_x} - \frac{i}{\Delta p_x}, \omega_{p_y} - \frac{j}{\Delta p_y}, \omega_{p_z} - \frac{k}{\Delta p_z}\right) \quad (9)$$

If equation (9) is then inserted in equation (8), a set of equations for the deconvolution is obtained, which can be written as follows:

$$D_S^f(x, y, \omega_{p_x}, \omega_{p_y}, \omega_{p_z}) = \sum_{k=-\infty}^{\infty}\sum_{j=-\infty}^{\infty}\sum_{i=-\infty}^{\infty} O^f\left(\omega_{p_x} - \frac{i}{\Delta p_x}, \omega_{p_y} - \frac{j}{\Delta p_y}, \omega_{p_z} - \frac{k}{\Delta p_z}\right) \times FT_{x',y',z'}\{E(x', y', z')H(x+x', y+y', z')\}\left(\omega_{p_x} - \frac{i}{\Delta p_x}, \omega_{p_y} - \frac{j}{\Delta p_y}, \omega_{p_z} - \frac{k}{\Delta p_z}\right) \quad (10)$$

If only one direction is considered, the general system of equations simplifies to equation (7) (for the z-direction in that case). Naturally, a reduction to two directions is also possible in analogous fashion.

What is common to all embodiments is that the individual pixel signals of the detector pixels are used to ascertain intermediate positions in at least one specified direction in the deconvolution and hence complement the scanning position and, ultimately, the scanning pixels with further intermediate positions. As a result, there are more pixels in the image than there were scanning pixels, i.e., scanning positions.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A method for high-resolution scanning microscopy of a sample comprising:
   a) illuminating the sample at a point in or on the sample by means of illu- mination radiation,
   b) imaging the point along an optical axis and according to a point spread function into a diffraction image on a spatially resolving surface detector that comprises detector pixels, wherein a diffraction structure of the diffraction image is resolved,
   c) displacing the point relative to the sample in at least two scanning directions and reading out pixel signals from the detector pixels in various scanning positions, wherein the pixel signals are respectively assigned to that scanning position at which they were read out and adjacent scanning positions overlap one another and are disposed according to a scanning increment,
   d) increasing resolution of an image of the sample beyond a resolution limit of the imaging being generated from the read pixel signals and the assigned scanning positions,
   wherein a deconvolution is carried out in step d) on the basis of the read pixel signals and the assigned scanning positions and on the basis of the point spread function, wherein intermediate positions are generated for at least one of the scanning directions in the deconvolution on the basis of the pixel signals and the image of the sample, which contains more image points than scanning positions, is generated.

2. The method as claimed in claim 1, wherein the scanning increment in step c) is greater than a full width at half maximum of the point spread function.

3. The method as claimed in claim 1, wherein, during the deconvolution, the pixel signals are Fourier transformed for each scanning position and the intermediate positions are generated in Fourier space.

4. The method as claimed in claim 1, wherein a linear deconvolution is carried out.

5. The method as claimed in claim 1, wherein the scanning direction comprises a z-direction aligned along the optical axis and the point is displaced relative to the sample in at least two scanning planes that are spaced apart in the z-direction and, in step d), a z-stack of images of the sample is generated, wherein the z-spacing in the stack is less than the scanning increment in the z-direction.

6. The method as claimed in claim 5, wherein the point spread function is not manipulated for the purposes of generating asymmetry and an absolute position with respect to the focal plane is ascertained by means of image information from the overlap region in the three-dimensional reconstruction.

7. The method as claimed in claim 1, wherein the point is displaced continuously in at least one of the scanning directions and readout times set scanning positions in this scanning direction.

8. A microscope for high-resolution scanning microscopy of a sample, comprising:
   an illumination beam path for illuminating a point on or in the sample,
   an imaging beam path for diffraction-limited imaging of the point along an optical axis into a diffraction image on a spatially resolving surface detector that has detector pixels, wherein the imaging beam path has a point spread function and the surface detector resolves the one diffraction structure of the diffraction image,
   a scanning device for displacing the point relative to the sample in at least two scanning directions, an evaluation device, which is connected in controlling fashion to the surface detector and the scanning device and which is configured to: (i) actuate the scanning device for displacing the point relative to the sample; (ii) read pixel signals from the detector pixels in respect of scanning position and to assign the pixel signals to the respective scanning position at which they were read, wherein adjacent scanning positions overlap and are disposed according to a scanning increment; and (iii) generate an image of the sample having a resolution that is increased beyond a resolution limit of the imaging beam path from the read pixel signals and the assigned scanning positions, wherein the evaluation device is further configured to carry out a deconvolution on the basis of the read pixel signals and the scanning positions belonging to the respective readout time and on the basis of the point spread function, wherein the evaluation device is configured to generate intermediate positions for at least one of the scanning directions in the deconvolution on the basis of the pixel signals and to generate the image of the sample, which contains more image points than scanning positions.

9. The microscope as claimed in claim 8, wherein the scanning increment is greater than a full width at half maximum of the point spread function.

10. The microscope as claimed in claim 8, wherein the evaluation device is configured, during the deconvolution, to Fourier transform the pixel signals for each scanning position and to generate the intermediate positions in Fourier space.

11. The microscope as claimed in claim 8, wherein the evaluation device is configured to carry out a linear deconvolution.

12. The microscope as claimed in claim 8, wherein the specified direction comprises a z-direction aligned along the optical axis and the evaluation device is configured to actuate the scanning device in such a way that the point is displaced relative to the sample in at least two scanning planes that are spaced apart in the z-direction and said evaluation device is further configured to generate a z-stack of images of the sample, wherein the z-spacing in the stack is less than the scanning incre- ment in the z-direction.

13. The microscope as claimed in claim 12, wherein the point spread function is not manipulated for the purposes of generating asymmetry and the evaluation device is configured to ascertain an absolute position with respect to the focal plane by means of image information from the overlap region in the three-di-mensional reconstruction.

* * * * *

UNITED STATES PATENT AND TRADEMARK OFFICE
CERTIFICATE OF CORRECTION

PATENT NO. : 11,209,636 B2
APPLICATION NO. : 16/732585
DATED : December 28, 2021
INVENTOR(S) : Kleppe et al.

It is certified that error appears in the above-identified patent and that said Letters Patent is hereby corrected as shown below:

On the Title Page

Item (57) Abstract, Line 10: now reads: "detector pixels in various scanning posi- tions, wherein the"
should read: --detector pixels in various scanning positions, wherein the--

In the Claims

Column 12, Line 5: now reads: "by means of illu- mination radiation,"
should read: --by means of illumination radiation,--

Column 14, Line 18: now reads: "is less than the scanning incre- ment in the z-direction."
should read: --is less than the scanning increment in the z-direction.--

Column 14, Line 24: now reads: "region in the three-di-mensional reconstruction."
should read: --region in the three-dimensional reconstruction.--

Signed and Sealed this
Twenty-second Day of March, 2022

Drew Hirshfeld
*Performing the Functions and Duties of the*
*Under Secretary of Commerce for Intellectual Property and*
*Director of the United States Patent and Trademark Office*